(12) United States Patent
Ozaki et al.

(10) Patent No.: US 8,208,880 B2
(45) Date of Patent: Jun. 26, 2012

(54) FREQUENCY CONTROL DEVICE, FREQUENCY CONTROL METHOD, BASE STATION APPARATUS, AND MOBILE STATION APPARATUS

(75) Inventors: Kazuyuki Ozaki, Kawasaki (JP); Yuuta Nakaya, Kawasaki (JP); Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 12/841,269

(22) Filed: Jul. 22, 2010

(65) Prior Publication Data

US 2011/0021155 A1 Jan. 27, 2011

(30) Foreign Application Priority Data

Jul. 27, 2009 (JP) .................. 2009-174347

(51) Int. Cl.
*H04B 1/18* (2006.01)

(52) U.S. Cl. ............... 455/192.2; 455/296; 455/334; 375/344; 375/346

(58) Field of Classification Search ............ 455/192.1, 455/192.2, 205, 255, 265, 296, 313, 334; 375/344, 346
See application file for complete search history.

(56) References Cited

U.S. PATENT DOCUMENTS 5,768,323 A * 6/1998 Kroeger et al. ............ 375/344
6,993,083 B1 * 1/2006 Shirakata et al. .......... 375/260
7,907,682 B2 * 3/2011 Lim et al. .................. 375/316
2006/0148411 A1 7/2006 Cho et al.

FOREIGN PATENT DOCUMENTS

| JP | 6-350503 | 12/1994 |
| JP | 2000-358265 | 12/2000 |
| JP | 2002-290371 | 10/2002 |
| JP | 2008-524913 | 7/2008 |

* cited by examiner

*Primary Examiner* — Quochien B Vuong
(74) *Attorney, Agent, or Firm* — Katten Muchin Rosenman LLP (57) ABSTRACT

There is provided a frequency control device that includes a frequency synchronizer to transform a radio signal to a baseband signal, a same signal correlator to obtain a first correlation value between a first signal in a first position in a first transmission symbol of the baseband signal and a second signal included in a second period, a different symbol correlator to obtain a second correlation value between a third signal included in a third period of the first transmission symbol and a fourth signal included in a fourth period, a frequency error estimator to estimate a frequency error added on the radio signal based on a phase rotation value of a difference value obtained by a subtraction of the second correlation value from the first correlation value, and a frequency corrector to correct the baseband signal to cancel the frequency error.

11 Claims, 8 Drawing Sheets

FREQUENCY CONTROL DEVICE, FREQUENCY CONTROL METHOD, BASE STATION APPARATUS, AND MOBILE STATION APPARATUS

CROSS-REFERENCE TO RELATED APPLICATION

This application is based upon and claims the benefit of priority of the prior Japanese Patent Application No. 2009-174347, filed on Jul. 27, 2009 the entire contents of which are incorporated herein by reference.

FIELD

The embodiments disclosed herein relate to a frequency control device, a frequency control method, a base station apparatus, and a mobile station apparatus, which control the frequency of a received radio signal.

BACKGROUND

In recent years, communication systems using radio signals, such as a mobile telephone system, have been widely used. In communication systems of this type, the frequency of a radio signal received by a receiver shifts from a predetermined frequency in some cases, owing to the fluctuation in oscillation frequency of a frequency oscillator used to cause a transmitter to generate a radio signal having a predetermined frequency. Further, the frequency of a radio signal received by a receiver shifts from a predetermined frequency in some cases, owing to the modulation of the radio signal occurring in a transmission path through which the radio signal is transmitted. To accurately extract data from the received radio signal, therefore, it is desired that the receiver correct a frequency error due to the shift of the received frequency.

In view of the above, a method has been known which, when a radio signal has two periods including the same signal waveform at predetermined time intervals, calculates the frequency error on the basis of the correlation value between respective signals of the two periods. According to an orthogonal frequency division multiplex (OFDM) method, for example, a guard interval (GI) for reducing the influence of multipath is provided at the head of a transmission symbol. The guard interval contains a copy of the signal of a tail end portion of an effective symbol that is a data carrying portion of the transmission symbol. Therefore, with the calculation of the correlation between the guard interval and the tail end portion of the effective symbol in a transmission symbol, the frequency error is estimated as the phase rotation amount of the correlation value.

However, if there is an interference signal, such as a radio signal transmitted from another communication system and having the same frequency range as the frequency range of the intended radio signal, the above-described correlation value includes the correlation value of the interference signal. According to the above-described technique, therefore, the frequency error is not accurately calculated. In view of this, a technique has been proposed which detects the frequency error by subtracting an offset value based on the interference signal, which is calculated from the correlation value between two signal periods included in the period other than the guard interval, from the correlation value between the guard interval and the corresponding effective signal.

The related art includes Japanese Laid-open Patent Publication No. 2002-290371.

SUMMARY

According to an aspect of the invention, a frequency control device includes a frequency synchronizer to transform a radio signal having a radio frequency to a baseband signal having a baseband frequency by multiplication of the radio signal by a local signal, a same signal correlator to obtain a first correlation value between a first signal included in a first period of a first transmission symbol in the baseband and a second signal included in a second period, the second signal being equivalent to the first signal, the second period being shifted from the first period by a effective symbol length corresponding to a unit length for orthogonal transform of a carrier wave included in the radio signal, a different symbol correlator to obtain a second correlation value between a third signal included in a third period of the first transmission symbol and a fourth signal included in a fourth period, the fourth period being shifted from the third period by integral multiple of the effective symbol length and included in a second transmission symbol different from the first transmission symbol, a frequency error estimator to estimate a frequency error added on the radio signal based on a phase rotation value of a difference value obtained by a subtraction of the second correlation value from the first correlation value, and a frequency corrector to correct the baseband signal to cancel the frequency error.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

To calculate the offset value, however, the existing technique calculates the correlation value between two signals shifted from each other by a period not corresponding to an integral multiple of the effective symbol length. With the thus obtained correlation value, therefore, the phase rotation amount of the interference signal component varies in accordance with a value obtained by multiplication of the frequency error added to the radio signal by the ratio between the length of the shift period and the effective symbol length. Meanwhile, as for the correlation value between the guard interval and the corresponding effective signal, the two signals are shifted from each other by the effective symbol length. Therefore, the phase rotation amount of the interference signal component varies in accordance with the frequency error added to the radio signal. As described above, the interference signal components included in the correlation values have different phase rotation amounts. According to the existing technique, therefore, the phase rotation amount attributed to the interference signal is not accurately estimated. As a result, there is a possibility that the frequency error may not be accurately corrected.

With reference to the drawings, a frequency control device according to one embodiment will be described below. The present frequency control device calculates the correlation value between a signal included in a predetermined period of a focused transmission symbol of a received radio signal and a signal included in a period shifted from the predetermined period by an integral multiple of an effective symbol length corresponding to a unit length for orthogonal transform of a carrier wave included in the radio signal. Further, the present frequency control device estimates a frequency error on the basis of a difference obtained by subtraction of the correlation value from the correlation value between a signal included in a guard interval of the focused transmission symbol and a signal included in a tail end portion of an effective symbol. With this configuration, the present frequency control device aims to reduce, even in the presence of an interference signal interfering with the radio signal, the influence of the interference signal on the estimation of the frequency error.

In the present embodiment, it is assumed that the radio signal is a signal modulated in accordance with the OFDM method, and that the guard interval is located at the head of each transmission symbol and followed by the effective symbol. It is also assumed that the guard interval contains a copy of the signal of the tail end portion of the effective symbol. However, the radio signal subjected to frequency control may be any radio signal, as long as the signal included in a predetermined period of the effective symbol of the radio signal is copied at a position shifted from the predetermined period by the effective symbol length.

Figure 1:
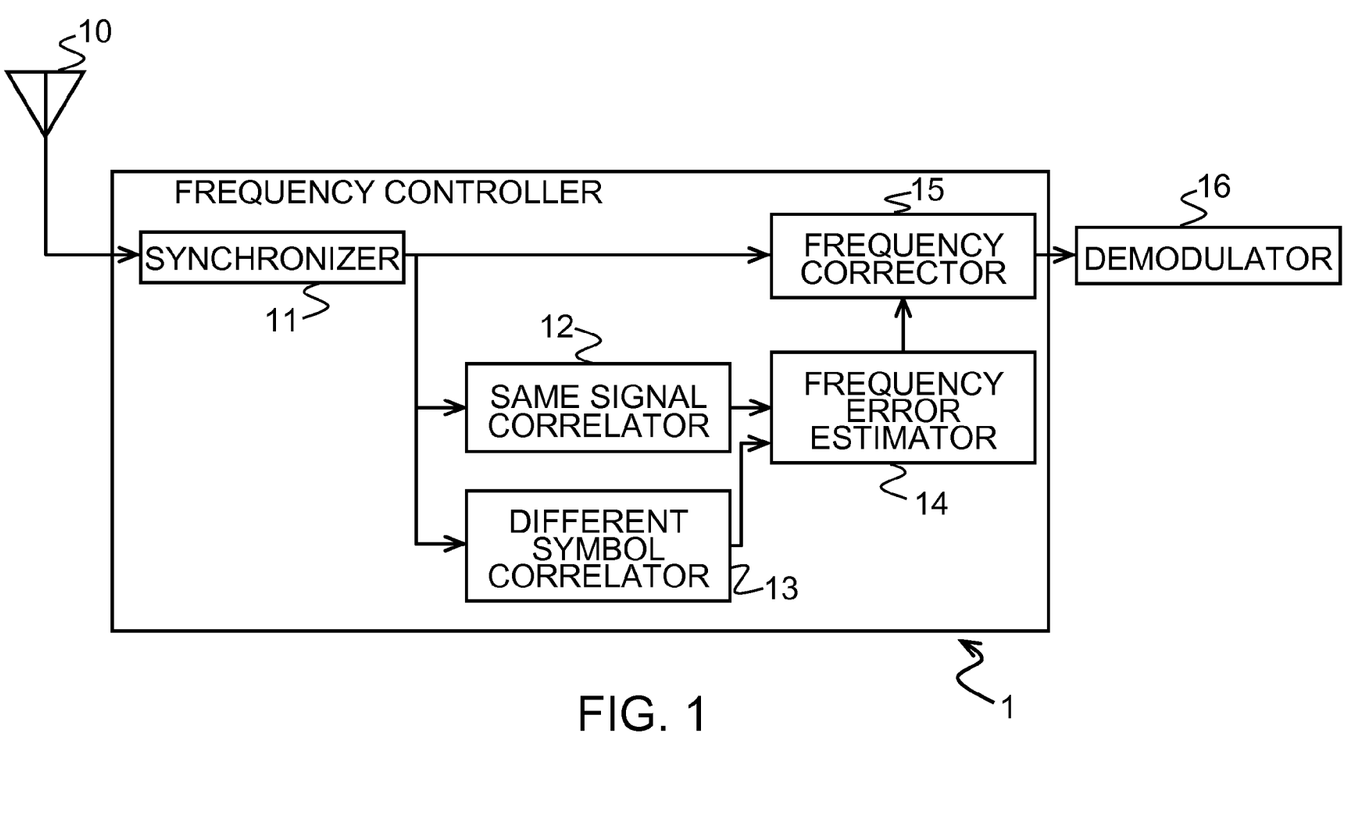
FIG. 1 is a schematic configuration diagram of a frequency control device according to one embodiment.

FIG. 1 is a schematic configuration diagram of a frequency control device 1 according to one embodiment. The frequency control device 1 includes a frequency synchronizer 11, a same signal correlator 12, a different symbol correlator 13, a frequency error estimator 14, and a frequency corrector 15.

Each of these components included in the frequency control device 1 is formed as a separate circuit. Alternatively, these components included in the frequency control device 1 may be mounted on the frequency control device 1 as one integrated circuit integrating circuits corresponding to the components.

The frequency synchronizer 11 is connected to an antenna 10. The frequency synchronizer 11 includes, for example, a quadrature demodulator (not illustrated) and a local oscillator (not illustrated) which oscillates a local signal that is a periodic signal having a local oscillation frequency. Further, the frequency synchronizer 11 multiplies a radio signal received via the antenna 10 and having a carrier frequency in a radio frequency range by the local signal, to thereby convert the radio signal into a baseband signal having a frequency in a baseband range. The frequency synchronizer 11 inputs the baseband signal to the quadrature demodulator. The quadrature demodulator samples the baseband signal at a predetermined sampling frequency, to thereby generate digitized I-signal (In-phase signal) and Q-signal (Quadrature signal). Then, the frequency synchronizer 11 outputs the I-signal and the Q-signal to the same signal correlator 12, the different symbol correlator 13, and the frequency corrector 15.

To estimate the frequency error, the same signal correlator 12 calculates, for each transmission symbol, the correlation value between the signal included in the guard interval and the signal included in the tail end portion of the effective symbol shifted from the guard interval by the effective symbol length. To perform the calculation, the same signal correlator 12 includes, for example, a delay circuit (not illustrated) and a correlation calculation circuit (not illustrated). Further, the delay circuit delays the I-signal and the Q-signal received from the frequency synchronizer 11 by the effective symbol length. Further, the correlation calculation circuit calculates the correlation between the I-signal and the Q-signal output from the delay circuit and delayed by the effective symbol length and the I-signal and the Q-signal directly received from the frequency synchronizer 11, to thereby calculate a same signal correlation value. A same signal correlation value $C_d$ is calculated in accordance with the following equation.

$$C_d = \sum_{t=-N_g}^{-1} y^*(t)y(t+N_{fft}) \tag{1}$$

Herein, y(t) represents the baseband signal, which is obtained by synthesization of the I-signal and the Q-signal. Further, y*(t) represents the complex conjugate of the baseband signal, and $N_{fft}$ represents the number of sampling points in orthogonal transform, such as fast Fourier transform, allocated to the effective symbol length. Meanwhile, $N_g$ represents the number of sampling points in frequency conversion included in the guard interval. Therefore, a transmission symbol of the baseband signal includes a sampling signal included in a period corresponding to the guard interval ($-N_g$, $-1$) and a sampling signal included in a period corresponding to the effective symbol (0, $N_{fft}-1$). Further, t represents the position of a sampling point in a transmission symbol.

Herein, if the interference signal is absent, the baseband signal y(t) includes only a transmission signal x(t) transmitted from a transmitter. In this case, the baseband signal y(t) and the transmission signal x(t) have the following relationship.

$$y(t)=x(t)\exp(j2\pi\Delta ft/N_{fft}) \tag{2}$$

Herein, $\Delta f$ represents the frequency error added to the transmission signal x(t). Further, as described above, the signal included in the period corresponding to the guard interval ($-N_g$, $-1$) is equal to the signal included in the period corresponding to the tail end portion of the effective symbol ($N_{fft}-N_g$, $N_{fft}-1$). On the basis of the equations (1) and (2), therefore, the same signal correlation value $C_d$ is calculated in accordance with the following equation.

$$C_d = \sum_{t=-N_g}^{-1} y^*(t)y(t+N_{fft}) \tag{3}$$

$$= \sum_{t=-N_g}^{-1} \left\{ \begin{array}{c} x(t)\exp(j2\pi\Delta ft/N_{fft})* \\ \{x(t+N_{fft})\exp\{j2\pi\Delta f(t+N_{fft})/N_{fft}\} \end{array} \right\}$$

$$= \sum_{t=N_g}^{-1} x^*(t) \times (t+N_{fft})\exp(j2\pi\Delta f)$$

$$= \exp(j2\pi\Delta f) \sum_{t=-N_g}^{-1} |x(t+N_{fft})|^2$$

Herein, x*(t) represents the complex conjugate of x(t). As described above, if the interference signal is absent, the frequency error Δf is calculated on the basis of the phase rotation amount of the same signal correlation value $C_d$.

Meanwhile, if the interference signal is present, the baseband signal y(t) is represented as the follow equation.

$$y(t)=(x(t)+u(t))\exp(j2\pi\Delta ft/N_{fft}) \quad (4)$$

Herein, u(t) represents the interference signal. In this case, if there is no correlation between the transmission signal x(t) and the interference signal u(t), and if there is a correlation between interference signals, the same signal correlation value $C_d$ is calculated in accordance with the following equation.

$$C_d = \sum_{t=-N_g}^{-1} y*(t)y(t+N_{fft})$$

$$= \sum_{t=-N}^{-1} [\{x(t)+u(t)\}\exp(j2\pi\Delta ft/N_{fft})]*$$
$$[\{x(t+N_{fft})+u(t+N_{fft})\}\exp\{j2\pi\Delta f(t+N_{fft})/N_{fft}\}]$$

$$= \exp(j2\pi\Delta f) \sum_{t=-N_g}^{-1} \{x(t)+u(t)\}*\{x(t+N_{fft})+u(t+N_{fft})\}$$

$$= \exp(j2\pi\Delta f) \sum_{t=-N_g}^{-1} x^*(t) \times (t+N_{fft}) + u^*(t)u(t+N_{fft})$$

$$= \exp(j2\pi\Delta f) \sum_{t=-N_g}^{-1} |x(t+N_{fft})|^2 +$$

$$\exp(j2\pi\Delta f) \sum_{t=-N_g}^{-1} |u(t)|^2 \exp(j2\pi f_i)$$

$$= \exp(j2\pi\Delta f) \sum_{t=-N_g}^{-1} |x(t+N_{fft})|^2 + \exp\{j2\pi(\Delta f+f_i)\} \sum_{t=-N_g}^{-1} |u(t)|^2$$

Herein, $f_i$ represents the frequency of the interference signal u(t). Further, u*(t) represents the complex conjugate of the interference signal u(t).

If the interference signal is present, the same signal correlation value $C_d$ also includes a value obtained by multiplication of the autocorrelation value of the interference signal by a phase rotation amount attributed to the frequency of the interference signal and the frequency error Δf, as illustrated in the equation (5). Therefore, the frequency control device 1 is prevented from directly estimating the frequency error Δf from the same signal correlation value $C_d$. Thus, the frequency control device 1 subtracts a component relating to the autocorrelation value of the interference signal from the same signal correlation value $C_d$, as described later, to thereby estimate the frequency error Δf. For the estimation, the same signal correlator 12 transfers the same signal correlation value $C_d$ to the frequency error estimator 14.

The different symbol correlator 13 acquires the value of a term of the above equation (5) relating to the autocorrelation of the interference signal. To acquire the value, the different symbol correlator 13 calculates the correlation value between the signal included in a predetermined period of the focused transmission symbol and the signal included in a period of a transmission symbol different from the focused transmission symbol and shifted from the predetermined period by an integral multiple of the effective symbol length.

The different symbol correlator 13 includes, for example, a delay circuit (not illustrated) and a correlation calculation circuit (not illustrated). Further, the delay circuit delays the I-signal and the Q-signal received from the frequency synchronizer 11 by an integral multiple of the effective symbol length. However, the modulation applied to the interference signal may fluctuate in accordance with the timing at which the frequency control device 1 receives the radio signal. Further, a change in the degree of modulation applied to the interference signal prevents accurate calculation of the autocorrelation value of the interference signal. Therefore, it is preferred that the delay circuit delay the I-signal and the Q-signal received from the frequency synchronizer 11 by one time the effective symbol length. Further, the correlation calculation circuit calculates the correlation between the I-signal and the Q-signal output from the delay circuit and delayed by the effective symbol length and the I-signal and the Q-signal directly received from the frequency synchronizer 11, to thereby calculate a different symbol correlation value. A different symbol correlation value $E_d$ is calculated in accordance with the following equation.

$$E_d = \sum_{t=a}^{b} y(t)y*(t-mN_{fft}) \quad (6)$$

Herein, m represents a natural number, a represents the start point of the predetermined period, and b represents the end point of the predetermined period. The predetermined period may be, for example, the guard interval of a transmission symbol. In this case, the equations $a=-N_g$ and $b=-1$ hold. Further, if the intensity of the interference signal is substantially the same regardless of the position in the focused transmission symbol, the predetermined period may be a period other than the guard interval. The different symbol correlator 13 transfers the different symbol correlation value $E_d$ to the frequency error estimator 14.

Figure 2:
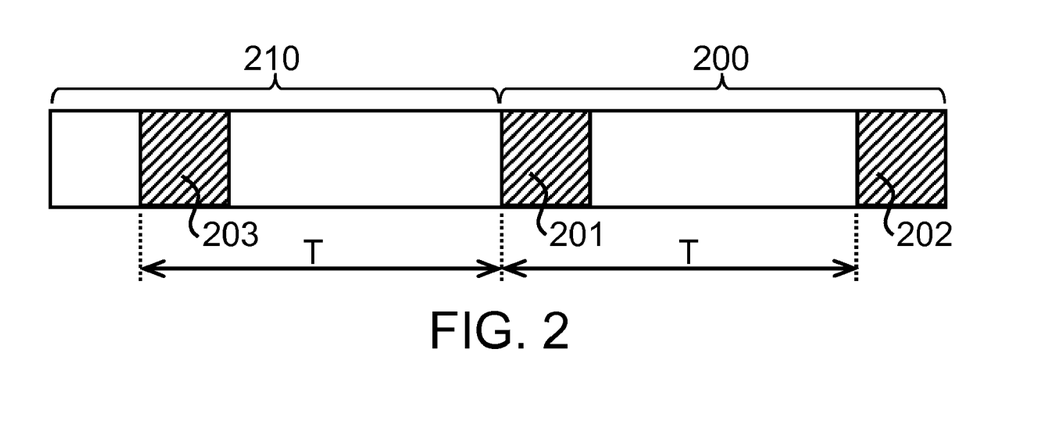
FIG. 2 is a conceptual diagram illustrating an example of signal periods used to calculate a same signal correlation value and a different symbol correlation value.

FIG. 2 is a conceptual diagram illustrating an example of signal periods used to calculate the same signal correlation value and the different symbol correlation value. In FIG. 2, a block 200 represents the focused transmission symbol, and a block 210 represents a transmission symbol immediately preceding the focused transmission symbol. Further, a block 201 included in the block 200 represents the guard interval of the focused transmission symbol. In this case, the same signal correlation value is calculated as the correlation value between the signal included in the guard interval 201 and the signal included in a period 202 shifted from the guard interval 201 by an effective symbol length T. Further, the different symbol correlation value is calculated as the correlation value between, for example, the signal included in the guard interval 201 and the signal included in a period 203 included in the transmission symbol 210 and located at a position shifted from the guard interval 201 by the effective symbol length T.

The frequency error estimator 14 estimates the frequency error $\Delta f$ on the basis of a difference obtained by subtraction of the different symbol correlation value $E_d$ from the same signal correlation value $C_d$.

Herein, a case is assumed in which the baseband signal y(t) is represented as the equation (4) owing to the presence of the interference signal u(t). It is assumed that there is no correlation between the interference signal u(t) and the transmission signal x(t). Therefore, if the predetermined period included in the focused transmission symbol and used to calculate the different symbol correlation value $E_d$ is the guard interval, the different symbol correlation value $E_d$ is represented as the following equation.

$$\begin{aligned} E_d &= \exp(i2\pi\Delta f) \sum_{t=-N_g}^{-1} \{x(t) + u(t)\}\{x(t - mN_{f\!f\!t}) + u(t - mN_{f\!f\!t})\}^* \\ &= \exp(j2\pi\Delta f) \sum_{t=-N_g}^{-1} x(t)x^*(t - mN_{f\!f\!t}) + u(t)u^*(t - mN_{f\!f\!t}) \\ &= \exp(j2\pi\Delta f) \sum_{t=-N_g}^{-1} |u(t)|^2 \exp(i2\pi f_i) \\ &= \exp\{j2\pi(\Delta f + f_i)\} \sum_{t=-N_g}^{-1} |u(t)|^2 \end{aligned} \qquad (7)$$

With the predetermined period set as described above, the signal period used to calculate the different symbol correlation value $E_d$ is equal to the signal period used to calculate the same signal correlation value $C_d$. As illustrated in the equation (7), therefore, the different symbol correlation value $E_d$ is equal to the second term of the equation (5) representing the same signal correlation value $C_d$. With the subtraction of the different symbol correlation value $E_d$ from the same signal correlation value $C_d$, therefore, the frequency error estimator 14 is capable of obtaining a value resulting from multiplication of the autocorrelation value of the transmission signal by the phase rotation amount corresponding to the frequency error $\Delta f$, similarly as in the equation (3). Thus, the frequency error estimator 14 estimates the frequency error $\Delta f$ from the phase rotation amount of the difference obtained by the subtraction of the different symbol correlation value $E_d$ from the same signal correlation value $C_d$. If the intensity of the interference signal is constant regardless of the position in the transmission symbol, and if the predetermined period used to calculate the different symbol correlation value $E_d$ is a period other than the guard interval and has the same length as the length of the guard interval, the interference signal component of the same signal correlation value $C_d$ and the different symbol correlation value $E_d$ are equal to each other. Also in this case, therefore, the frequency error estimator 14 is capable of estimating the frequency error $\Delta f$ from the phase rotation amount of the difference obtained by the subtraction of the different symbol correlation value $E_d$ from the same signal correlation value $C_d$. The frequency error estimator 14 transfers the estimated frequency error $\Delta f$ to the frequency corrector 15.

The frequency corrector 15 corrects the baseband signal to cancel the frequency error $\Delta f$ received from the frequency error estimator 14. Specifically, to cancel a phase rotation amount $2\pi\Delta ft/N_{f\!f\!t}$, the frequency corrector 15 multiplies the I-signal and the Q-signal of the baseband signal by an in-phase component and a quadrature component corresponding to $\exp(-j2\pi\Delta ft/N_{f\!f\!t})$, respectively. The frequency corrector 15 outputs the baseband signal, in which the frequency error has been corrected. The baseband signal output from the frequency corrector 15 is input to a demodulator 16. The demodulator 16 performs demodulation processing, such as discrete Fourier transform, parallel-serial conversion, and error correction, on the baseband signal, to thereby reproduce a data signal carried by the radio signal.

Figure 3:
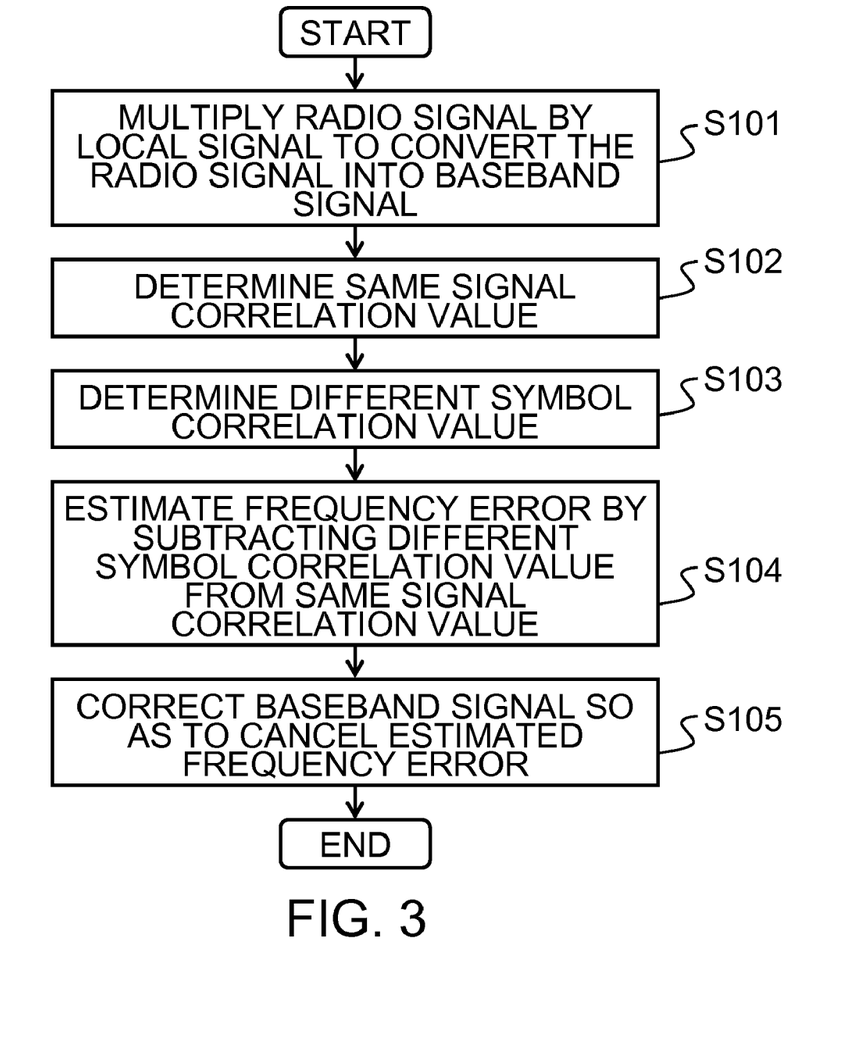
FIG. 3 is an operation flowchart of frequency control processing performed by the frequency control device according to the one embodiment.

FIG. 3 is an operation flowchart of frequency control processing performed by the frequency control device 1. During the reception of the radio signal, the frequency control device 1 performs the frequency control processing on respective transmission symbols. Alternatively, the frequency control device 1 may repeat the frequency control processing at predetermined time intervals. As illustrated in FIG. 3, the frequency synchronizer 11 first multiplies the radio signal received via the antenna 10 by the local signal, to thereby convert the radio signal having a radio frequency into a baseband signal having a baseband frequency (Step S101). Then, the frequency synchronizer 11 outputs the baseband signal to the same signal correlator 12, the different symbol correlator 13, and the frequency corrector 15.

The same signal correlator 12 calculates, as the same signal correlation value, the correlation value between the signal included in the guard interval of the focused transmission symbol of the baseband signal and the signal included in the tail end portion of the effective symbol shifted from the guard interval by the effective symbol length (Step S102). Then, the same signal correlator 12 outputs the same signal correlation value to the frequency error estimator 14. Further, the different symbol correlator 13 calculates, as the different symbol correlation value, the correlation value between the signal included in a predetermined period of the focused transmission symbol and the signal included in a period of a different transmission symbol located at a position shifted from the predetermined period by an integral multiple of the effective symbol length (Step S103). Then, the different symbol correlator 13 outputs the different symbol correlation value to the frequency error estimator 14.

The frequency error estimator 14 subtracts the different symbol correlation value from the same signal correlation value. Then, the frequency error estimator 14 calculates the phase rotation amount of the resultant difference, to thereby estimate the frequency error added to the radio signal (Step S104). The frequency error estimator 14 outputs the estimated frequency error to the frequency corrector 15. The frequency corrector 15 corrects the baseband signal to cancel the estimated frequency error (Step S105). Then, the frequency corrector 15 outputs the baseband signal, in which the frequency error has been corrected. Then, the frequency control device 1 completes the frequency control processing. The order of the process of Step S102 and the process of Step S103 may be reversed. Further, the process of Step S102 and the process of Step S103 may be performed in parallel.

As described above, the present frequency control device 1 calculates, as the different symbol correlation value, the correlation value between the signal included in a predetermined period of the focused transmission symbol and the signal included in a period of a different transmission symbol shifted from the predetermined period by an integral multiple of the effective symbol length. The phase rotation amount of the different symbol correlation value is equal to the phase rotation amount of the interference signal component included in the same signal correlation value. Therefore, the present frequency control device 1 is capable of removing the interference signal component by subtracting the different symbol correlation value from the same signal correlation value.

Accordingly, the present frequency control device 1 is capable of estimating the frequency error even in the presence of the interference signal.

Figure 4:
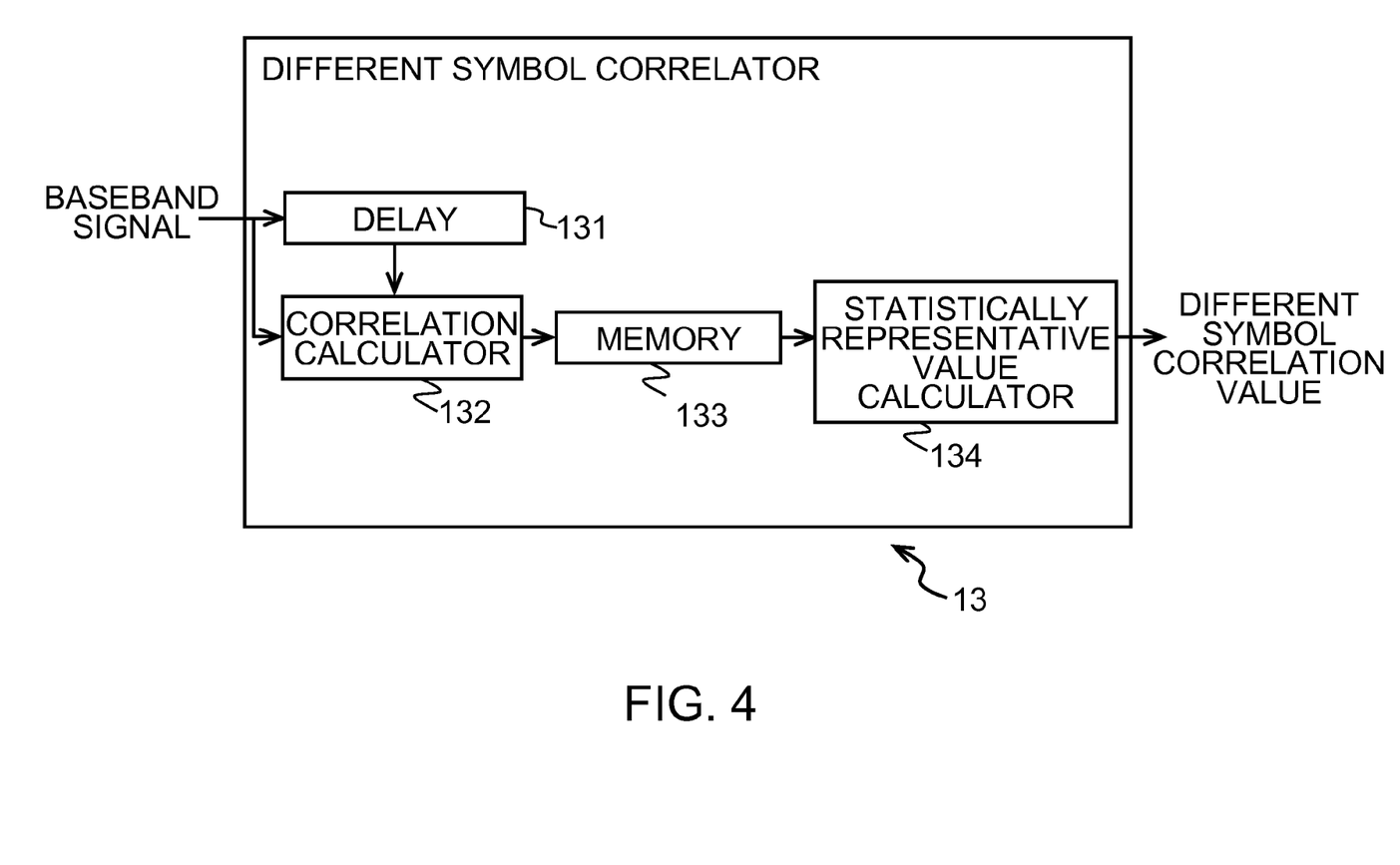
FIG. 4 is a schematic configuration diagram of another example of a different symbol correlator.

A modified example of the above-described embodiment will be described below. FIG. 4 is a schematic configuration diagram of another example of the different symbol correlator 13 of the frequency control device 1 according to the above-described embodiment. In the present modified example, the different symbol correlator 13 calculates, as the different symbol correlation value of the latest transmission symbol, a statistically representative value, such as the mean, median, or mode, of the different symbol correlation values calculated for a plurality of transmission symbols including the latest transmission symbol. To perform the calculation, the different symbol correlator 13 includes a delay circuit 131, a correlation calculation circuit 132, a memory circuit 133, and a statistically representative value calculation circuit 134.

The delay circuit 131 delays the input baseband signal by an integral multiple of the effective symbol length. The correlation calculation circuit 132 calculates the correlation between the guard interval period of the input baseband signal and the guard interval period of the baseband signal output from the delay circuit 131, to thereby calculate the different symbol correlation value. Further, every time the different symbol correlation value is calculated for each of the transmission symbols, the correlation calculation circuit 132 stores the different symbol correlation value in the memory circuit 133. The memory circuit 133 stores the different symbol correlation values calculated for the latest transmission symbol and at least one different transmission symbol input during a predetermined period immediately before the latest transmission symbol. Then, the statistically representative value calculation circuit 134 calculates the statistically representative value of the plurality of different symbol correlation values stored in the memory circuit 133. Then, the different symbol correlator 13 outputs, as the different symbol correlation value of the latest transmission symbol, the statistically representative value of the different symbol correlation values calculated by the statistically representative value calculation circuit 134.

With the statistically representative value of the plurality of different symbol correlation values thus set as the different symbol correlation value of the latest transmission symbol, the different symbol correlator 13 is capable of reducing the fluctuation in the different symbol correlation value due to noise applied to the radio signal in a transmission path. The statistically representative value calculation circuit 134 may store the mean of the different symbol correlation values in the memory circuit 133. In this case, the statistically representative value calculation circuit 134 adds a value obtained by multiplication of the different symbol correlation value of the latest transmission symbol by a forgetting factor $\alpha$ to a value obtained by multiplication of the mean of the different symbol correlation values calculated for the immediately preceding transmission symbol by a value $(1-\alpha)$. Then, the statistically representative value calculation circuit 134 sets the resultant value as the statistically representative value of the different symbol correlation values of the latest transmission symbol.

Further, similarly to the modified example of the different symbol correlator 13, the same signal correlator 12 may also set, as the same signal correlation value of the latest transmission symbol, the statistically representative value, such as the mean, median, or mode, of the same signal correlation values calculated for a plurality of transmission symbols including the latest transmission symbol.

Further, the same signal correlator 12 may set, as the same signal correlation value, the correlation value between the signal included in a first period forming a part of the guard interval and the signal included in a second period shifted from the first period by the effective symbol length. In this case, the length of the first period is equal to the length of the second period, and the signal included in the first period is the same as the signal included in the second period. Similarly, the different symbol correlation value may also be the correlation value between the signal included in a period forming a part of the guard interval of the focused transmission symbol and the signal included in a period of a different transmission symbol having the same length as the length of the above period and shifted from the above period by the effective symbol length.

Further, the length of the period used to calculate the same signal correlation value may be different from the length of the period used to calculate the different symbol correlation value. In this case, however, the intensity of the interference signal component included in the same signal correlation value and the intensity of the different symbol correlation value are different from each other. Therefore, it is preferred that the frequency error estimator 14 subtract, from the same signal correlation value, a value obtained by multiplication of the different symbol correlation value by the ratio (lc/le) of the length lc of the period used to calculate the same signal correlation value to the length le of the period used to calculate the different symbol correlation value.

Figure 5:
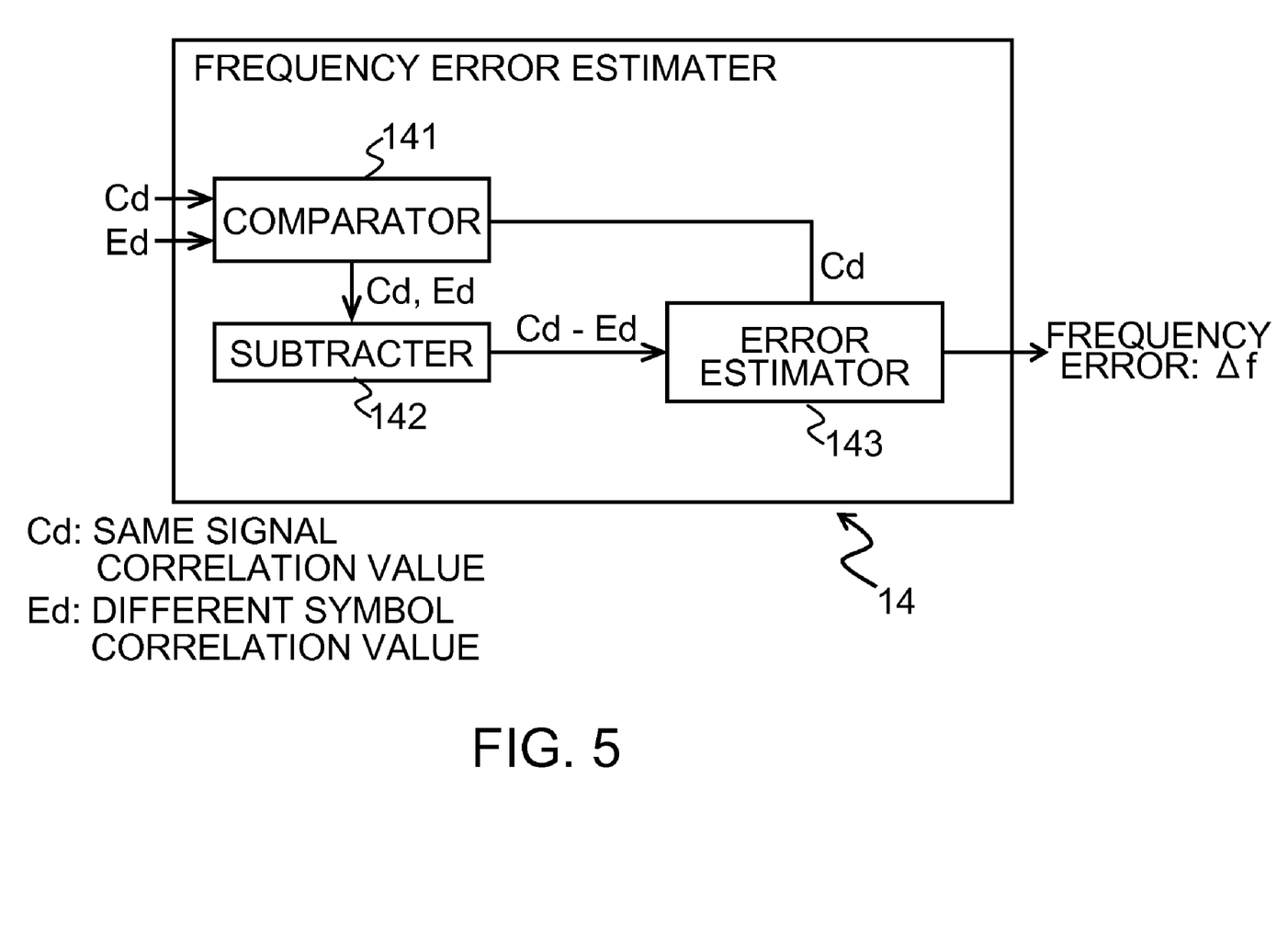
FIG. 5 is a schematic configuration diagram of another example of a frequency error estimator.

FIG. 5 is a schematic configuration diagram of another example of the frequency error estimator 14 included in the frequency control device 1 according to the above-described embodiment. In the present modified example, when the interference signal is too substantial to ignore as compared with the radio signal intended to be received, the frequency error estimator 14 estimates the frequency error on the basis of the value obtained by the subtraction of the different symbol correlation value from the same signal correlation value. Meanwhile, if the interference signal is absent, or if the level of the interference signal is ignorable as compared with the radio signal intended to be received, the frequency error estimator 14 estimates the frequency error from the same signal correlation value. To perform the estimation, the frequency error estimator 14 includes a comparison circuit 141, a subtraction circuit 142, and an error estimation circuit 143.

The comparison circuit 141 compares the ratio $|E_d|/|C_d|$ between the absolute value of the different symbol correlation value and the absolute value of the same signal correlation value with a predetermined threshold value Tha. If the ratio $|E_d|/|C_d|$ is equal to or more than the threshold value Tha, the comparison circuit 141 inputs the different symbol correlation value and the same signal correlation value to the subtraction circuit 142. Meanwhile, if the ratio $|E_d|/|C_d|$ is less than the threshold value Tha, the comparison circuit 141 inputs the same signal correlation value to the error estimation circuit 143. The threshold value Tha is set experimentally or on the basis of a simulation result. For example, if the probability of the ratio $|E_d|/|C_d|$ being less than 0.09 in the absence of the interference signal is approximately 100%, the threshold value Tha is set to be 0.09.

The subtraction circuit 142 subtracts the different symbol correlation value from the same signal correlation value, to thereby remove a component corresponding to the interference signal from the same signal correlation value. Then, the subtraction circuit 142 inputs the difference obtained by the subtraction of the different symbol correlation value from the same signal correlation value to the error estimation circuit 143.

The error estimation circuit 143 calculates the phase rotation amount of the input value, to thereby estimate the frequency error. If the interference signal is absent, the phase rotation amount of the same signal correlation value input from the comparison circuit 141 is proportional to the frequency error Δf, as obvious from the equation (3). Meanwhile, if the interference signal is present, the phase rotation amount of the difference $(C_d-E_d)$ between the same signal correlation value $C_d$ and the different symbol correlation value $E_d$ is also proportional to the frequency error Δf, as obvious from the equations (5) and (7). Therefore, the error estimation circuit 143 is capable of calculating the estimated value of the frequency error Δf by dividing the phase rotation amount of the input value by 2π.

Figure 6:
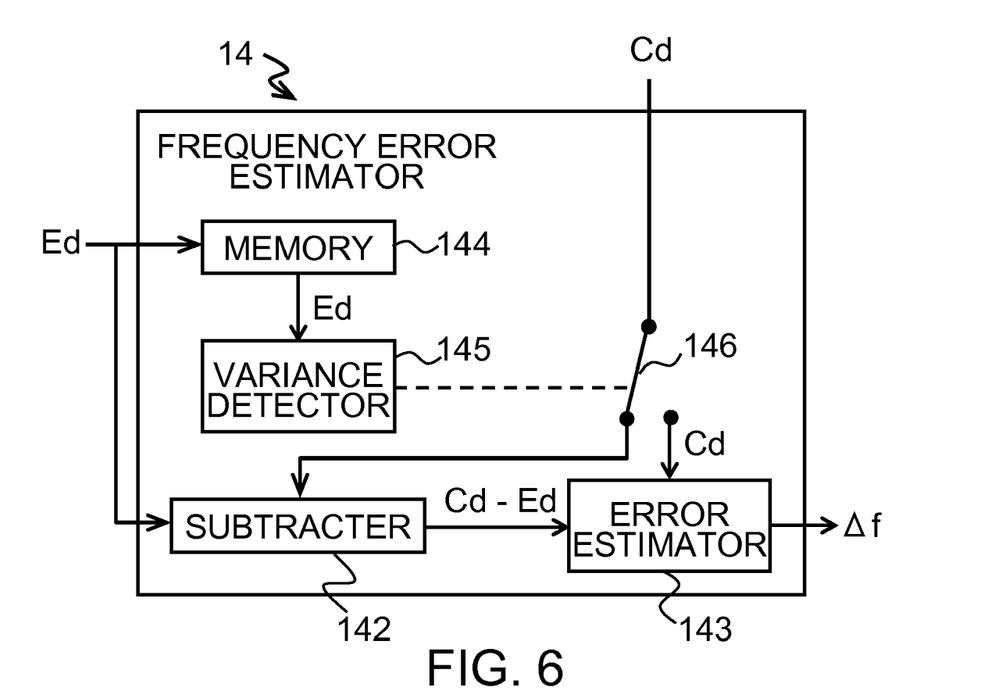
FIG. 6 is a schematic configuration diagram of still another example of the frequency error estimator.

FIG. 6 is a schematic configuration diagram of still another example of the frequency error estimator 14 included in the frequency control device 1 according to the above-described embodiment. In the present modified example, the frequency error estimator 14 determines whether or not the interference signal is present on the basis of the dispersion of the different symbol correlation values calculated for a plurality of transmission symbols. Further, if the interference signal is present, the frequency error estimator 14 estimates the frequency error on the basis of the difference between the same signal correlation value and the different symbol correlation value. Meanwhile, if the interference signal is absent, the frequency error estimator 14 estimates the frequency error from the same signal correlation value. To perform the estimation, the frequency error estimator 14 includes a subtraction circuit 142, an error estimation circuit 143, a memory circuit 144, a dispersion detection circuit 145, and a switch 146. The subtraction circuit 142 and the error estimation circuit 143 are respectively the same in function as the subtraction circuit 142 and the error estimation circuit 143 included in the frequency error estimator 14 illustrated in FIG. 5.

Every time the different symbol correlation value is input to the frequency error estimator 14, the memory circuit 144 stores the different symbol correlation value. Further, the memory circuit 144 stores the different symbol correlation values calculated for a plurality of transmission symbols including the latest transmission symbol. The dispersion detection circuit 145 calculates the dispersion of phase components of the plurality of different symbol correlation values stored in the memory circuit 144. If the interference signal is present over the plurality of transmission symbols, the phase component has a value according to the frequency of the interference signal and the frequency error added to the radio signal, as obvious from the equation (7). Meanwhile, if the interference signal is absent, the different symbol correlation value corresponds to the correlation value between two mutually uncorrelated signals, and thus the phase component thereof also has a random value. Therefore, if the value of the dispersion is equal to or less than a predetermined threshold value Thv, the dispersion detection circuit 145 determines that the interference signal is present. Then, the dispersion detection circuit 145 switches the switch 146 such that the same signal correlation value is input to the subtraction circuit 142 together with the different symbol correlation value.

Meanwhile, if the value of the dispersion is more than the predetermined threshold value Thv, the dispersion detection circuit 145 determines that the interference signal is absent. Then, the dispersion detection circuit 145 switches the switch 146 such that the same signal correlation value is input to the error estimation circuit 143. The threshold value Thy is set experimentally or on the basis of a simulation result. For example, if the probability of the value of the dispersion being equal to or less than 0.01 in the presence of the interference signal is approximately 100%, and if the probability of the value of the dispersion being 0.01 in the absence of the interference signal is approximately 0%, the threshold value Thy is set to be 0.01.

Figure 7:
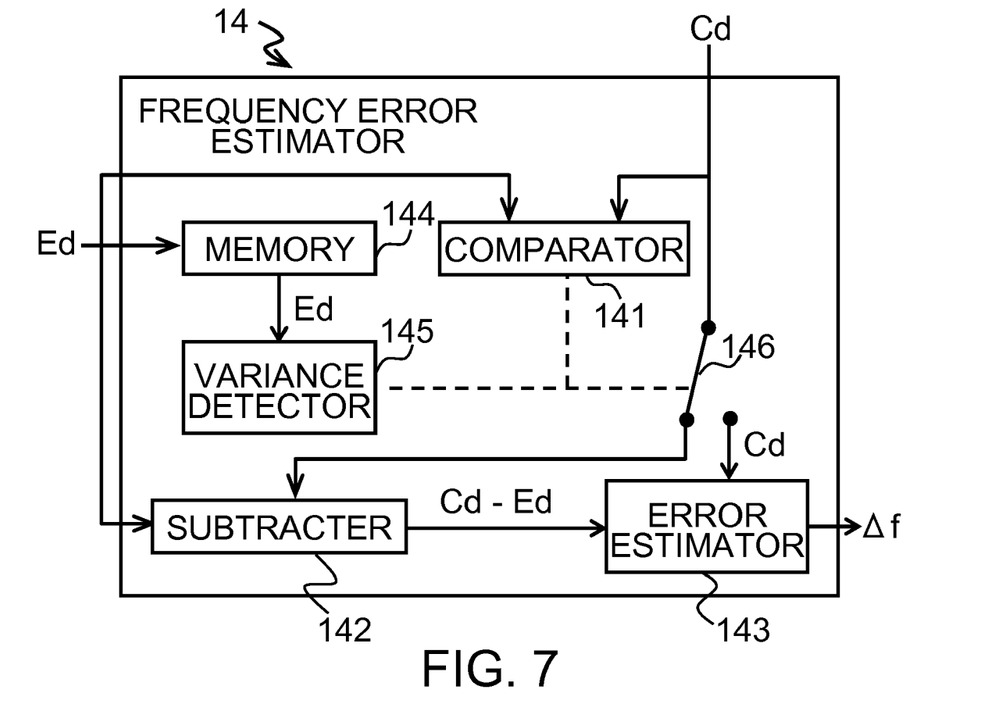
FIG. 7 is a schematic configuration diagram of yet still another example of the frequency error estimator.

FIG. 7 is a schematic configuration diagram of yet still another example of the frequency error estimator 14 included in the frequency control device 1 according to the above-described embodiment. In the present modified example, the frequency error estimator 14 determines whether or not the interference signal is present on the basis of the dispersion of the different symbol correlation values calculated for a plurality of transmission symbols and the ratio between the absolute value of the different symbol correlation value and the absolute value of the same signal correlation value. Further, if the interference signal is present, the frequency error estimator 14 estimates the frequency error on the basis of the value obtained by the subtraction of the different symbol correlation value from the same signal correlation value. Meanwhile, if the interference signal is absent, the frequency error estimator 14 estimates the frequency error from the same signal correlation value. To perform the estimation, the frequency error estimator 14 includes a comparison circuit 141, a subtraction circuit 142, an error estimation circuit 143, a memory circuit 144, a dispersion detection circuit 145, and a switch 146. These circuits included in the frequency error estimator 14 are similar in function to the circuits illustrated in FIG. 5 or FIG. 6 and designated with the same reference numerals as the reference numerals designating these circuits. In the present modified example, if the comparison circuit 141 determines that the ratio between the absolute value of the different symbol correlation value and the absolute value of the same signal correlation value is equal to or more than the threshold value Tha, and if the dispersion detection circuit 145 determines that the value of the dispersion of the phase components is equal to or less than the threshold value Thv, the presence of the interference signal is determined. Then, the error estimation circuit 143 estimates the frequency error from the phase rotation amount of the value obtained by the subtraction of the different symbol correlation value from the same signal correlation value calculated by the subtraction circuit 142.

Meanwhile, if the comparison circuit 141 determines that the ratio between the absolute value of the different symbol correlation value and the absolute value of the same signal correlation value is less than the threshold value Tha, or if the dispersion detection circuit 145 determines that the value of the dispersion of the phase components is more than the threshold value Thv, the absence of the interference signal is determined. Then, the error estimation circuit 143 estimates the frequency error from the phase rotation amount of the same signal correlation value.

As described above, if the interference signal is present, the frequency error estimator 14 according to each of the above modified examples estimates the frequency error on the basis of the value obtained by the subtraction of the different symbol correlation value from the same signal correlation value. Further, if the interference signal is absent, the frequency error estimator 14 estimates the frequency error from the same signal correlation value. If the interference signal is absent, the different symbol correlation value includes only a noise component unusable for the estimation of the frequency error. If the interference signal is absent, therefore, the frequency error estimator 14 directly estimates the frequency error from the same signal correlation value. Accordingly, it is possible to prevent the estimation accuracy of the frequency error from being deteriorated by the influence of noise.

One of the modified examples of the different symbol correlator 13 or the same signal correlator 12 may be combined with one of the modified examples of the frequency error estimator 14.

Figure 8:
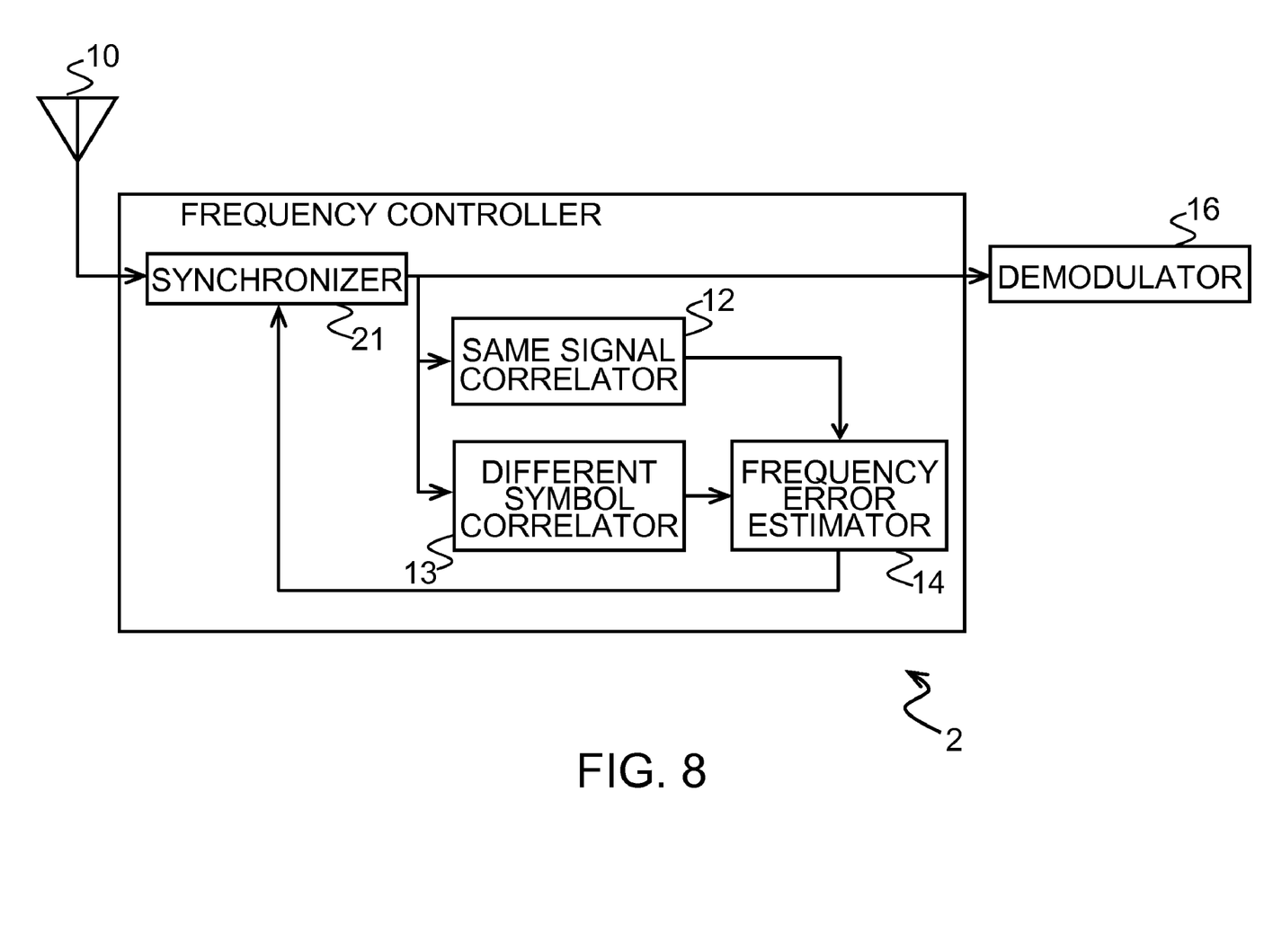
FIG. 8 is a schematic configuration diagram of a frequency control device according to another embodiment.

FIG. 8 is a schematic configuration diagram of a frequency control device according to another embodiment. A frequency control device 2 illustrated in FIG. 8 includes a frequency synchronization corrector 21, a same signal correlator 12, a different symbol correlator 13, and a frequency error estimator 14. Further, the respective components of the frequency control device 2 are designated by the same reference numerals as the reference numerals of the corresponding components of the frequency control device 1 illustrated in FIG. 1. Compared with the frequency control device 1 illustrated in FIG. 1, the frequency control device 2 is different from the frequency control device 1 in that the frequency control device 2 includes, in place of the frequency synchronizer 11 and the frequency corrector 15, the frequency synchronization corrector 21 which changes the frequency of the local signal in accordance with the estimated frequency error.

The frequency synchronization corrector 21 includes, for example, a voltage-controlled oscillator. The voltage-controlled oscillator generates a local signal having a frequency obtained by addition of the frequency error received from the frequency error estimator 14 to a local oscillation frequency or by subtraction of the frequency error from the local oscillation frequency. Then, the frequency synchronization corrector 21 multiplies the radio signal received via the antenna 10 by the local signal oscillated by the voltage-controlled oscillator. Thereby, the frequency synchronization corrector 21 is capable of generating a baseband signal which has a predetermined baseband frequency, and in which the frequency error of the received radio signal has been corrected.

Figure 9:
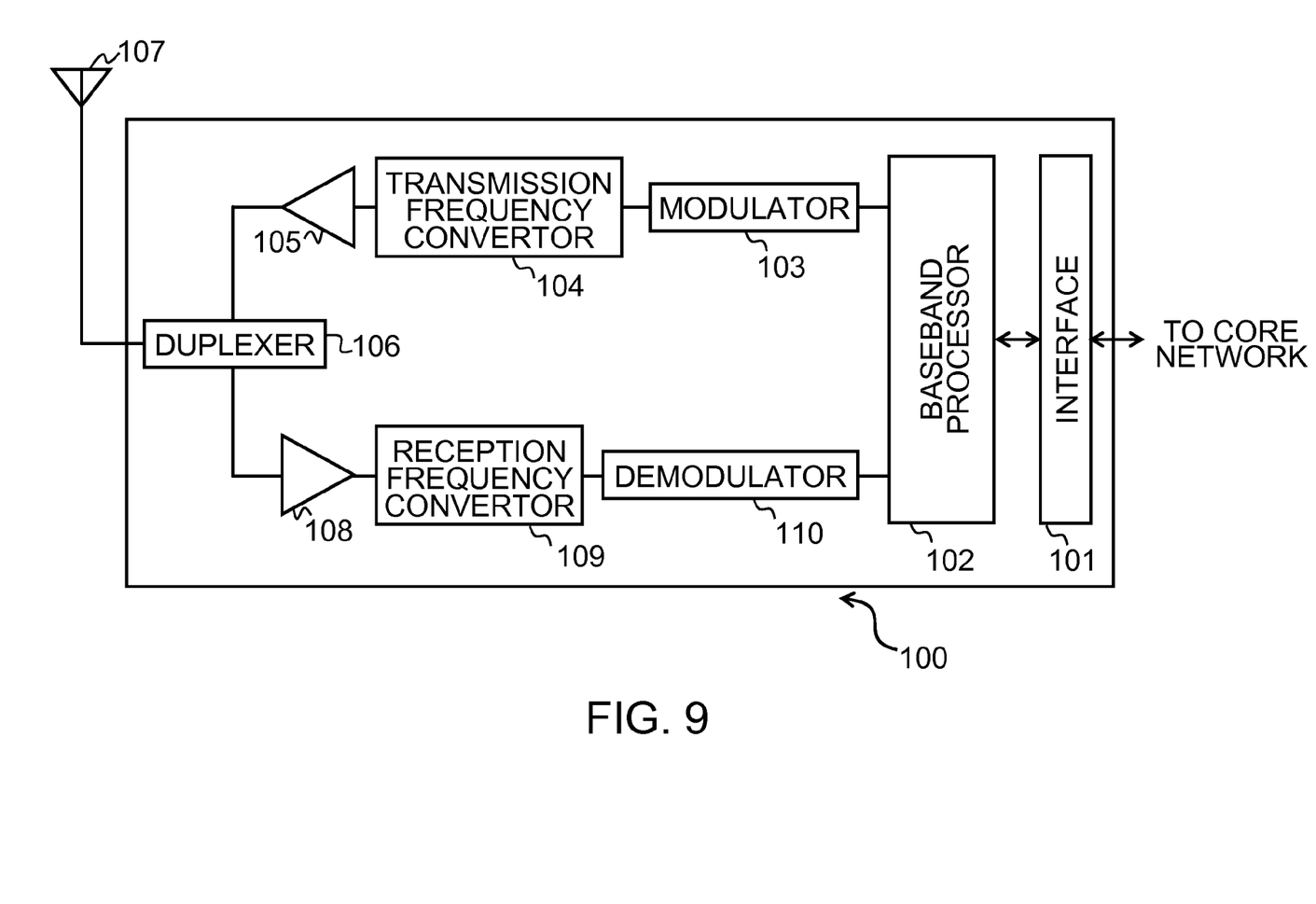
FIG. 9 is a schematic configuration diagram of a base station apparatus incorporating therein the frequency control device according to one of the embodiments.

FIG. 9 is a schematic configuration diagram of a base station apparatus incorporating therein one of the frequency control devices 1 and 2 according to the above-described embodiments. A base station apparatus 100 includes an interface 101, a baseband processor 102, a modulator 103, a transmission frequency convertor 104, a transmission amplifier 105, a duplexer 106, an antenna 107, a reception amplifier 108, a reception frequency convertor 109, and a demodulator 110. Among these components, the reception frequency convertor 109 may be one of the frequency control devices 1 and 2 according to the above-described embodiments. Further, each of the baseband processor 102, the modulator 103, the transmission frequency converter 104, the demodulator 110, and the reception frequency convertor 109 may be formed as a separate circuit. Alternatively, these components may be formed as one integrated circuit integrating circuits having the respective functions of these components.

The interface 101 includes a communication interface to be connected to a core network. Further, the interface 101 receives from the core network a downlink signal to be transmitted to a mobile station, and outputs the downlink signal to the baseband processor 102. Meanwhile, the interface 101 receives from the baseband processor 102 an uplink signal received from the mobile station, and outputs the uplink signal to the core network.

The baseband processor 102 performs transmission processing, such as error correction coding processing including convolution coding or turbo coding, on the downlink signal, and outputs the coded downlink signal to the modulator 103. Further, the baseband processor 102 receives the uplink signal demodulated by the demodulator 110, and performs reception processing, such as error correction decoding processing, on the uplink signal. Then, the baseband processor 102 outputs the decoded uplink signal to the interface 101.

The modulator 103 modulates the coded downlink signal received from the baseband processor 102 in accordance with a modulation method such as OFDM, and multiplexes the downlink signal. The modulator 103 outputs the modulated downlink signal to the transmission frequency convertor 104. The transmission frequency convertor 104 superimposes the downlink signal on a carrier wave having a radio frequency. Then, the transmission frequency convertor 104 outputs the downlink signal superimposed on the carrier wave to the transmission amplifier 105. The transmission amplifier 105 includes a high-power amplifier. Further, the transmission amplifier 105 amplifies the intensity of the downlink signal superimposed on the carrier wave to a desired level, and transmits the downlink signal to the antenna 107 via the duplexer 106. Then, the antenna 107 radiates the downlink signal transmitted from the transmission amplifier 105.

Further, the antenna 107 receives the uplink signal transmitted from the mobile station, and transmits the uplink signal to the reception amplifier 108 via the duplexer 106. The reception amplifier 108 includes a low-noise amplifier. Further, the reception amplifier 108 amplifies the received uplink signal, and outputs the amplified uplink signal to the reception frequency convertor 109.

The reception frequency convertor 109 converts the frequency of the uplink signal from the radio frequency into the baseband frequency. Further, as described above in the respective embodiments, the reception frequency convertor 109 corrects the uplink signal to cancel the frequency error. In this process, the reception frequency convertor 109 calculates the different symbol correlation value and the same signal correlation value of the focused transmission symbol, and estimates the frequency error from the phase rotation amount of the difference obtained by the subtraction of the different symbol correlation value from the same signal correlation value. Then, the reception frequency convertor 109 transfers, to the demodulator 110, the uplink signal which has the baseband frequency, and in which the frequency error has been corrected.

In accordance with a modulation method such as OFDM, the demodulator 110 demodulates the uplink signal having the baseband frequency and received from the reception frequency convertor 109. Then, the demodulator 110 outputs the demodulated uplink signal to the baseband processor 102.

Figure 10:
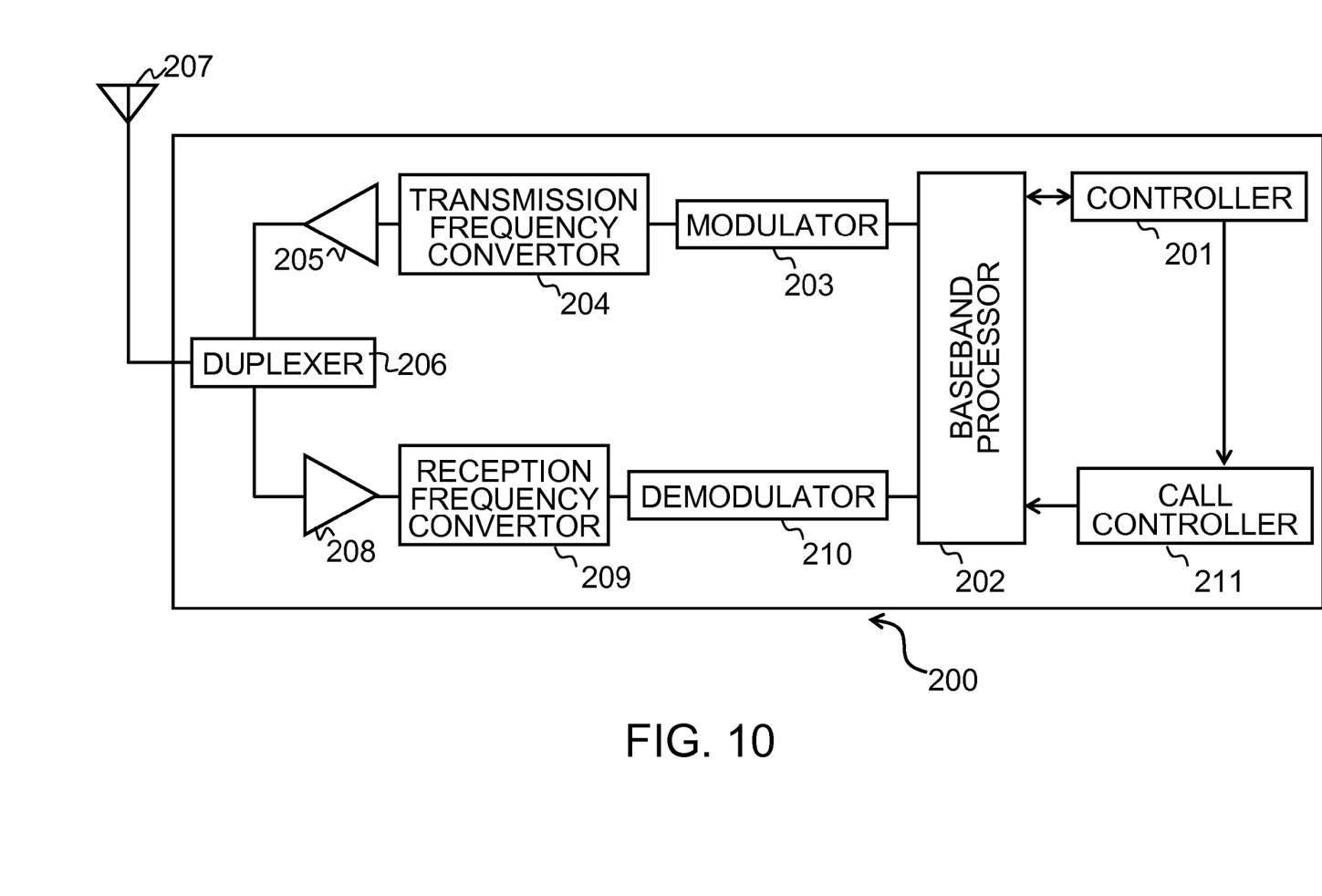
FIG. 10 is a schematic configuration diagram of a mobile station apparatus incorporating therein the frequency control device according to one of the embodiments.

FIG. 10 is a schematic configuration diagram of a mobile station apparatus incorporating therein one of the frequency control devices 1 and 2 according to the above-described embodiments. A mobile station apparatus 200 includes a controller 201, a baseband processor 202, a modulator 203, a transmission frequency convertor 204, a transmission amplifier 205, a duplexer 206, an antenna 207, a reception amplifier 208, a reception frequency convertor 209, a demodulator 210, and a call controller 211.

Among these components, the reception frequency convertor 209 may be one of the frequency control devices 1 and 2 according to the above-described embodiments. Further, the reception frequency convertor 209 converts the frequency of a downlink signal received from a base station apparatus via the antenna 207 from the radio frequency into the baseband frequency. Further, as described above in the respective embodiments, the reception frequency convertor 209 corrects the downlink signal to cancel the frequency error. In this process, the reception frequency convertor 209 calculates the different symbol correlation value and the same signal corre lation value of the focused transmission symbol, and estimates the frequency error from the phase rotation amount of the difference obtained by the subtraction of the different symbol correlation value from the same signal correlation value.

Further, the baseband processor 202 is similar in function to the baseband processor 102 included in the base station apparatus 100 illustrated in FIG. 9. Similarly, each of the modulator 203, the transmission frequency convertor 204, the transmission amplifier 205, the duplexer 206, the antenna 207, the reception amplifier 208, and the demodulator 210 is similar in function to the corresponding component of the base station apparatus 100. Further, each of the controller 201, the baseband processor 202, the modulator 203, the transmission frequency convertor 204, the reception frequency convertor 209, the demodulator 210, and the call controller 211 may be formed as a separate circuit. Alternatively, these components may be formed as one integrated circuit integrating circuits having the respective functions of these components.

The controller 201 controls the entire mobile station apparatus 200. Further, the controller 201 executes a variety of application programs operating on the mobile station apparatus 200. To execute the application programs, the controller 201 includes a processor, a nonvolatile memory, and a volatile memory. Further, when an application for performing communication, such as telephone communication and data communication, is started by an operation performed by a user via an operation unit (not illustrated), such as a keypad, included in the mobile station apparatus 200, the controller 201 operates the call controller 211 in accordance with the application. Then, the controller 201 performs information source coding processing on data requested to be transmitted by the application or an audio signal acquired from a microphone (not illustrated) included in the mobile station apparatus 200. Then, the controller 201 transfers the signal obtained as a result of the above processes to the baseband processor 202 as an uplink signal. Further, upon receipt of the downlink signal from the baseband processor 202, the controller 201 performs, for example, decoding processing of an information source code, to thereby acquire an audio signal or data. Then, the controller 201 transfers the audio signal to a speaker (not illustrated) included in the mobile station apparatus 200. Further, the controller 201 displays the acquired data on a display (not illustrated) included in the mobile station apparatus 200.

The call controller 211 performs call control processing, such as call, response, and disconnection, between the mobile station apparatus 200 and the base station apparatus. Further, in accordance with the result of the call control processing, the call controller 211 instructs the baseband processor 202 to start or complete the operation.

All examples and conditional language recited herein are intended for pedagogical purposes to aid the reader in understanding the present invention and the concepts contributed by the present inventors to furthering the art, and are to be construed as being without limitation to any of the configurations of the examples in the present specification and such specifically recited examples and conditions related to the indication of the superiority and inferiority of the present invention. Although the embodiments of the present invention have been described in detail, it should be understood that various changes, substitutions, and alterations could be made hereto without departing from the spirit and scope of the present invention.

What is claimed is:

1. A frequency control device comprising:
a frequency synchronizer to transform a radio signal having a radio frequency to a baseband signal having a baseband frequency by multiplication of the radio signal by a local signal;
a same signal correlator to obtain a first correlation value between a first signal included in a first period of a first transmission symbol in the baseband and a second signal included in a second period, the second signal being equivalent to the first signal, the second period being shifted from the first period by a effective symbol length corresponding to a unit length for orthogonal transform of a carrier wave included in the radio signal;
a different symbol correlator to obtain a second correlation value between a third signal included in a third period of the first transmission symbol and a fourth signal included in a fourth period, the fourth period being shifted from the third period by integral multiple of the effective symbol length and included in a second transmission symbol different from the first transmission symbol;
a frequency error estimator to estimate a frequency error added on the radio signal based on a phase rotation value of a difference value obtained by a subtraction of the second correlation value from the first correlation value; and
a frequency corrector to correct the baseband signal to cancel the frequency error.

2. The frequency control device according to claim 1, wherein the frequency error estimator estimates the frequency error added on the radio signal based on the phase rotation amount of the difference when a ratio of an absolute value of the second correlation value to an absolute value of the second correlation value is equal or more than a first threshold value corresponding to presence of an interference signal to the radio signal, and the frequency error estimator estimates the frequency error based on the phase rotation amount of the first correlation value when the ratio is less than the first threshold.

3. The frequency control device according to claim 1, wherein the frequency error estimator estimates the frequency error added on the radio signal based on the phase rotation amount of the difference when a dispersion of phase components of the second correlation values calculated for a plurality of transmission symbols including the first transmission symbol is equal or less than a second threshold value corresponding to presence of the interference signal to the radio signal, and the frequency error estimator estimates the frequency error based on the phase rotation amount of the first correlation value when the dispersion is more than the second threshold.

4. The frequency control device according to claim 1, wherein the frequency error estimator estimates the frequency error added on the radio signal based on the phase rotation amount of the difference when a ratio of an absolute value of the second correlation value to an absolute value of the first correlation value is equal or more than a first threshold value corresponding to presence of an interference signal to the radio signal and a dispersion of phase components of the second correlation values calculated for a plurality of transmission symbols including the first transmission symbol is equal or less than a second threshold value corresponding to presence of the interference signal to the radio signal, and the frequency error estimator estimates the frequency error based on the phase rotation amount of the first correlation value when the ratio is less than the first threshold or the dispersion is more than the second threshold.

5. The frequency control device according to claim 1, wherein the different symbol correlator sets a statistically representative value as the second correlation value of the first transmission symbol, the statistically representative value is obtained based on the second correlation values calculated for each of a plurality of transmission symbols including the first transmission symbol signal.

6. The frequency control device according to claim 1, wherein a length of the third period is equal to a length of the first period.

7. The frequency control device according to claim 1, wherein a length of the third period is equal one of a length of the first period and a length of the second period.

8. The frequency control device according to claim 7, wherein the third period and the first period are included in a guard interval of the first transmission symbol.

9. A frequency control method comprising:
transforming a radio signal having a radio frequency to a baseband signal having a baseband frequency by multiplication of the radio signal by a local signal;
obtaining a first correlation value between a first signal included in a first period of a first transmission symbol in the baseband and a second signal included in a second period, the second signal being equivalent to the first signal, the second period being shifted from the first period by a effective symbol length corresponding to a unit length for orthogonal transform of a carrier wave included in the radio signal;
obtaining a second correlation value between a third signal included in a third period of the first transmission symbol and a fourth signal included in a fourth period, the fourth period being shifted from the third period by integral multiple of the effective symbol length and included in a second transmission symbol different from the first transmission symbol;
estimating a frequency error added on the radio signal based on a phase rotation value of a difference value obtained by a subtraction of the second correlation value from the first correlation value; and
correcting to correct the baseband signal to cancel the frequency error.

10. A base station apparatus comprising:
an antenna to receive a radio signal transmitted from a mobile device;
a frequency transformer
to transform the radio signal having a radio frequency to the baseband signal having a baseband frequency by multiplication of the radio signal by a local signal,
to obtain a first correlation value between a first signal included in a first period of a first transmission symbol in the baseband and a second signal included in a second period, the second signal being equivalent to the first signal, the second period being shifted from the first period by a effective symbol length corresponding to a unit length for orthogonal transform of a carrier wave included in the radio signal,
to obtain a second correlation value between a third signal included in a third period of the first transmission symbol and a fourth signal included in a fourth period, the fourth period being shifted from the third period by integral multiple of the effective symbol length and included in a second transmission symbol different from the first transmission symbol,
to estimate a frequency error added on the radio signal based on a phase rotation value of a difference value obtained by a subtraction of the second correlation value from the first correlation value, and
to correct the baseband signal to cancel the frequency error;
a demodulator to demodulate the baseband signal outputted from the frequency transformer;
a baseband processor to reproduce data included in signal demodulated by the demodulator; and
an interface to output the reproduced data to a core network.

11. A mobile station apparatus comprising:
an antenna to receive a radio signal transmitted from a base station apparatus;
a frequency transformer
to transform the radio signal having a radio frequency to the baseband signal having a baseband frequency by multiplication of the radio signal by a local signal,
to obtain a first correlation value between a first signal included in a first period of a first transmission symbol in the baseband and a second signal included in a second period, the second signal being equivalent to the first signal, the second period being shifted from the first period by a effective symbol length corresponding to a unit length for orthogonal transform of a carrier wave included in the radio signal,
to obtain a second correlation value between a third signal included in a third period of the first transmission symbol and a fourth signal included in a fourth period, the fourth period being shifted from the third period by integral multiple of the effective symbol length and included in a second transmission symbol different from the first transmission symbol,
to estimate a frequency error added on the radio signal based on a phase rotation value of a difference value obtained by a subtraction of the second correlation value from the first correlation value, and
to correct the baseband signal to cancel the frequency error;
a demodulator to demodulate the baseband signal outputted from the frequency transformer; and
a baseband processor to reproduce data included in signal demodulated by the demodulator.

* * * * *